No. 621,733. Patented Mar. 21, 1899.
T. F. WYNNE.
ELECTRIC BELT.
(Application filed Oct. 4, 1898.)
(No Model.)
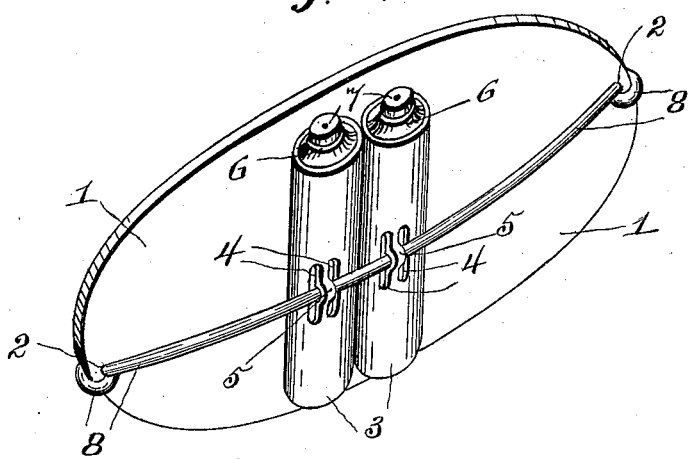
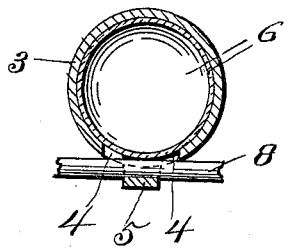
Witnesses.
E. E. Clark
H. Leslie Stevens
Inventor.
Thomas Fulton Wynne
By C. F. Belt,
Attorney.
THE NORRIS PETERS CO., PHOTO-LITHO., WASHINGTON, D. C.

UNITED STATES PATENT OFFICE.

THOMAS FULTON WYNNE, OF LINDALE, TEXAS.

ELECTRIC BELT.

SPECIFICATION forming part of Letters Patent No. 621,733, dated March 21, 1899.

Application filed October 4, 1898. Serial No. 692,598. (No model.)

*To all whom it may concern:*

Be it known that I, THOMAS FULTON WYNNE, a citizen of the United States, residing at Lindale, in the county of Smith and State of Texas, have invented certain new and useful Improvements in Electric Belts, of which the following is a specification.

This invention relates to electric belts, and particularly to a device for holding battery or fluid cells on electric belts.

The object of the invention is to provide an improved novel means for carrying the fluid-cells and a special and peculiar device for carrying such means on an electric belt.

The invention consists in the novel construction, combination, and arrangement of parts whereby the cells are held in upright position and prevented from turning, upsetting, or other displacement.

In the accompanying drawings, forming part of this application, Figure 1 is a perspective view. Fig. 2 is an enlarged cross-section of one of the cells and a pocket or case, taken through the slots of the pocket.

The same numeral references denote the same parts in the drawings.

The plate 1 is attached or connected in any suitable manner to any form of electric belts employing battery-cells.

The plate 1, while being shown as oblong, may be of any desired shape to suit the belt to which it is applied and has an eye or aperture 2 in each end.

The pockets or cell-cases 3 have vertical slots 4 and an intervening tongue 5, bent outward from the pockets between the slots of each pocket, and the pockets or cases have an open top to receive the battery-cells 6, having ordinary stoppers 7. The pockets or cases are held to the plate 1 by a wire 8, passed through the slots 4 and under the tongue 5 in engagement with the cells 6, the ends of the wire 8 being passed through the eyes 2 and bent around the ends of the plate 1, thereby fixing the wire to the plate and holding the pockets or cases securely to the plate, with a portion of the wire bearing on the cells, which keeps them from slipping out of the cases. It is obvious that the cases are held against turning, upsetting, or other displacement by the wire and that the cells are prevented from slipping out of the cases by the wire engaging the cells through the slots of the cases.

Having thus described my invention, what I claim as new, and desire to secure by Letters Patent, is—

1. The combination, with the cells, and cell-carrying plate, of the cell-pockets having slots and an outwardly-bent tongue, and the wire passed through the slots and under the tongues, and having its ends secured to the said plate, substantially as and for the purpose set forth.

2. The combination, with the cells, and the plate having eyes, of the cell-pockets having vertical slots, an outwardly-bent tongue between the slots, and the wire passed through the slots and under the tongue, in engagement with the cells, and through the said eyes, to hold the cells in the pockets, and the latter to the said plate.

In witness whereof I hereunto set my hand in the presence of two witnesses.

THOMAS FULTON WYNNE.

Witnesses:
C. E. HALL,
H. R. STUART.